United States Patent [19]
Griesinger

[11] 3,783,497
[45] Jan. 8, 1974

[54] METHOD FOR MAKING THIN WALLED METAL TUBING

[75] Inventor: Wolfram Griesinger, Ottobrunn, Germany

[73] Assignee: Kabel-und Metallwerke Gutehoffnungshutte Aktiengesellschaft, Hanover, Germany

[22] Filed: Feb. 24, 1972

[21] Appl. No.: 228,947

[30] Foreign Application Priority Data
Feb. 25, 1971 Germany............ P 21 08 895.9

[52] U.S. Cl............................ 29/460, 29/521, 72/51
[51] Int. Cl................................................ B23p 3/00
[58] Field of Search.................. 72/51, 52, 48; 29/202.5, 429, 460, 527.4; 113/54, 58, 1 N

[56] References Cited
UNITED STATES PATENTS
1,715,847   6/1929   Lindgren............................ 72/51
2,786,264   3/1957   Colombo........................ 29/460 UX
2,644,416   7/1953   Miller ................................... 72/51
2,436,383   2/1948   Dettman ............................. 72/48

Primary Examiner—Charles W. Lanham
Assistant Examiner—Robert M. Rogers
Attorney—Smyth, Roston & Pavitt

[57] ABSTRACT

Longitudinally paid metal strip or tape is formed into a tube, the two edges of the tape or strip having been flanged so that upon tube forming the flanges abut and extend radially outwardly; and squeezing the flanges for the flanges to undergo plastic deformation and forming a tightly closed tab; the two flanges may be differently high and the higher one is folded around the lower one prior to squeezing the flanges into a three layer tab. The two flanges may be quite long and of similar height, and they are bent over prior to squeezing to form a four layer tab. The tab may then be bent against the tube which is subsequently jacketed in plastic.

6 Claims, 4 Drawing Figures

PATENTED JAN 8 1974 3,783,497

METHOD FOR MAKING THIN WALLED METAL TUBING

The present invention relates to a method for making metal tubing having thin wall, such as is used in multi-layer jackets for electrical cables or as conduits for hot or cold fluids.

The manufacture of thin walled, welded metal tube is quite difficult, as the metal deforms quite easily. For example, butt welding the edges of a tubularly bent metal strip or tape is quite difficult, particularly in a manner that the welding seam is consistently tight and sealed for the entire length of the tubing. The thinner the tape, the more difficult it is to obtain a consistently tight and impervious seam. Holding the thin abutting edges in flush alignment is a rather delicate operation. Welding of overlapping edges is easier from that point of view, but creates its own problems. For example, the strip may have oxidized and welding through oxide layers does not produce reliable seams. On the other hand, the demand for tubing made from thin metal strip increases; such conduits are inexpensive, provided they can be sealed by economical process. Interest in these tubes has developed particularly because of their lower weight per unit length.

Thin walled conduits are used for transmission of gases, liquids, or vapor, provided they are tightly sealed and impervious. Also, in the field of cable engineering, metal tubing is used as protective jacket against moisture. This is particularly important for underground installation of communication cables or high power cables. The conductors proper are insulated and enveloped by such impervious tubing. Of course, the tubing must remain sealed during transportation and installation. For this, the cable with envelope should be flexible and reelable. Not only should the envelope provide protection against penetration of water vapor, but corrosion proofing and electric shielding are additional objectives.

It has been suggested to jacket a cable (or to make tubing generally) by bending metal tape tubularly and flanging the edges to form a radially inwardly or outwardly extending tab. The tab is then trimmed, welded, and folded flat against the tube. The tape had thickness of not more than 0.3 mm (about twelve one-thousandths of an inch). The tubular envelope as made was then lined or jacketed by a thermoplastic polymer, firmly adhering to the metal tube.

The present invention proceeds along a somewhat different line of development for obviating the drawbacks discussed above. The method of the invention does use the basic tube forming operation of longitudinally forming and shaping thin metal strip or tape into a tube; prior thereto or concurrently therewith, the edges of the tape or strip are flanged to obtain an outwardly extending tab consisting of the two adjoining flanges. Now, however, this tab is worked by plastic deforming using appropriate, pressure applying tooling for squeezing the flanges of the tab together; for example, the tab is rolled, preferably by using rolls of surface configuration to obtain crimping action for joining the two flanges. The plastic deformation must be sufficiently strong so as to obtain a tight, impervious joint.

A tube made in that manner is very flexible as there is no stiffening welding seam. Still, the tube is tightly closed and can readily be reeled, for example, on drums. The tubes are of high quality, very light, but resist wear. The principle of the invention cannot only be used for making conduits, but the tubular element may be used within the multi-layer structure for cable envelopes and jackets. The joint is not only absolutely impermeable to water vapor and the like, but provides also for excellent shielding, because electric conductivity around the circumference is not interrupted.

For practicing the invention in accordance with one embodiment, particularly for making tubing from tapes having thickness of not more than 0.3 mm, the flanges may have different height; the higher flange is bent back around the lower one, and pressure is applied so that the small flange is tightly sandwiched in between two different but integral portions of the large flange so as to obtain a three-ply tab. In case of similarly high flanges, both of them are folded over to obtain a tab that is four layers thick. Such re-enforced tab is then squeezed (e.g., rolled) to obtain a tight joint through clenching.

The tab as made should be folded against the surface of the tube, and the tube should then be covered, for example, by an adhering thermoplastic polymer, which may be covered, inturn, by another thermoplastic. Copper, aluminum, steel or the like are suitable materials for the tape or strip. As stated, the tube-forming process itself may proceed along conventional lines.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
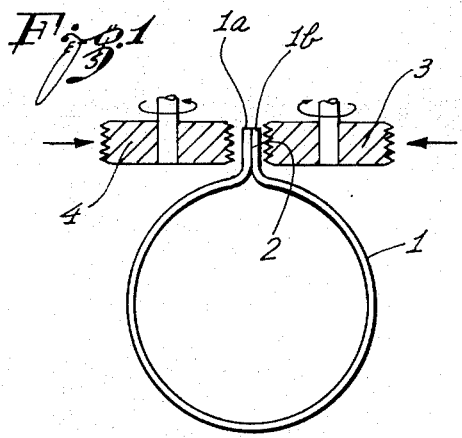
FIG. 1 shows cross section through a tube as made in accordance with one example of the present invention.

Proceeding now to the detailed description of the drawings, FIG. 1 illustrates a metal tape or strip 1 that has been bent to assume tubular configuration. The tape has been flanged at the two edges, and flanges 1a, 1b, are in abutting position after tube-forming has been completed, thereby establishing a tab 2. Actually, it may not be entirely correct to speak of a tab, just then, rather the two flanges 1a and 1b constitute two halves of a tab not yet made. The tape may be made of copper or aluminum.

Reference numerals 3 and 4 respectively refer to two rolls pertaining to a tool for squeezing the flanges in direction of the two arrows. The rolls may have suitable "rough" contour for crimping the flanges together. Crimping involves significant plastic deformation, and it was found that the two thin flanges are readily joined in that manner, and a quite satisfactorily impervious "seam" or joint is produced. FIG. 1 actually depicts the most simple way of practicing the invention.

As shown in FIG. 2, again a metal tape or strip 7 has been bent into tubular configuration, but along the edges two unequal flanges were formed. There is a relatively small one, 5, and (there was) a larger one, 6. Flange 6 may have been about twice as high as flange 5. After tube-forming, the large flange is folded over the small flange 5, so as to sandwich the latter from opposite sides. The arrows indicate again pressure (roller) application, squeezing flange 5 in between the two integral portions of folded-over flange 6 so as to form a three layer or three-ply tab. Folded flange 6 clenches flange 5 tightly and that provides for very tight sealing.

Figure 3:
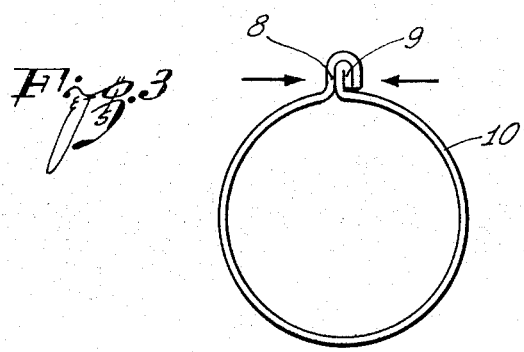

Turning now to FIG. 3, the tape or strip 10 has been processed, just as in FIG. 1, except that the flanges 8 and 9 are somewhat longer (radially). Now, these two abutting flanges are both bent or folded back together, i.e., by 180°, to form a four layer or four-ply configuration. The arrows indicate also here the directions of squeezing for deforming the flanges into a tight, sealed four layer tab and joint. Pressure may be applied by rollers, pistons or the like.

Figure 2:
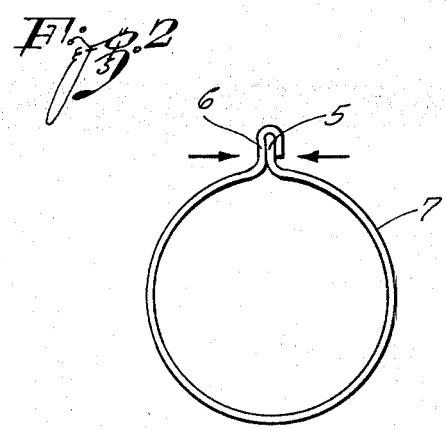
FIGS. 2 and 3 show cross sections through two examples for tube making in accordance with the preferred embodiment of the invention.

Each of the tubes as worked in accordance with the methods explained with reference to FIGS. 1, 2 and 3, has been made in a continuous process as follows. Metal strip or tape is longitudinally paid from a suitable supply drum. First, the edges are flanged and then the flanged tape is formed into a tube so that the flanges are made to abut. These flanges are then processed directly behind the tube-forming and bending equipment to obtain the tight and sealed joint as described. A mandrel may be provided to reach into the tube as it runs off the folding and tab-forming equipment, and the tab as formed may be folded against the tube, using that mandrel as internal support for preventing the tube from being deformed by the tab folding action.

Figure 4:
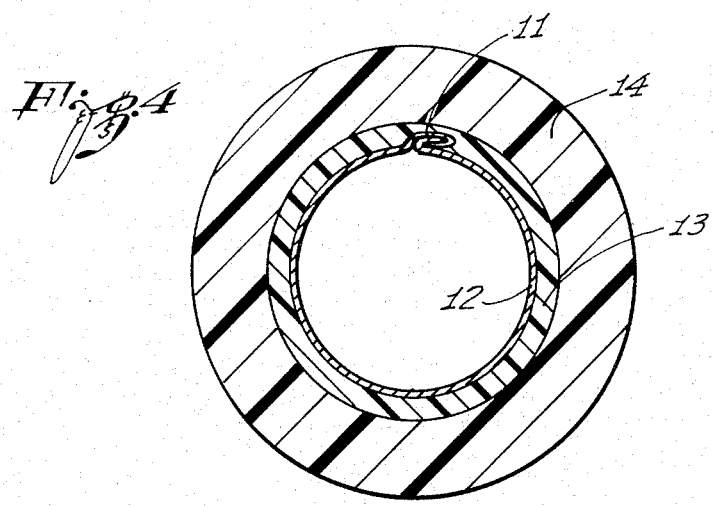
FIG. 4 shows completion of multi-layer tubing that includes tubing made in accorance with the preferred embodiment of the invention.

Reference numeral 11 in FIG. 4 denotes this flat tab, folded against tube 12, which has been made in accordance with any of the methods as described above. Following the tab folding, a layer 13 of a co-polymer is deposited around tube 12, firmly adhering thereto. As the metal tube 12 is quite thin, layer 13 provides for additional mechanical strength. The tube may additionally be clad in or lined with an outer jacket or envelope 14 made, for example, of a thermoplastic synthetic.

The tube made in that manner is quite strong, tightly sealed and impervious, and can be used for conducting hot or cold fluids. Alternatively, the tube may have been formed around a cable as jacketing thereof, in other words, the paid strip may have been formed around a conductor bundle for jacketing same. The cable conductors are now well protected against moisture, the multi layer jacketing is very tight and uniformly flexible.

The invention is not limited to the embodiments described above but all changes and modifications thereof not constituting departures from the spirit and scope of the invention are intended to be included.

I claim:

1. Method of making tightly sealed tubing having thin walls such as a thickness of about 12 mills or less, wherein a longitudinally paid metal strip or tape having that thickness is bent into a tube, the improvement comprising, flanging the tape or strip along its two edges, so that upon tube forming the flanges abut and extend radially outwardly; and squeezing the flanges when in radially outwardly extending disposition and in a direction transversely thereto and to the axis of the tube for the flanges to undergo plastic deformation thereby forming a tightly closed radially outwardly extending tab.

2. Method as in claim 1, the two flanges being differently high, the higher one folded around the lower one prior to squeezing the radially outwardly extending flanges into a three layer tab.

3. Method as in claim 2, wherein the one flange is about twice as high as the other flange.

4. Method as in claim 1, the two flanges bent back by about 180° prior to squeezing them into a four layer radially outwardly extending tab.

5. Method as in claim 1, followed by the step of folding the tab flat against the tube.

6. Method as in claim 5, followed by the step of covering the tube with at least one plastic layer.

* * * * *